Jan. 13, 1942. T. A. WETZEL 2,269,800
STOKER CONTROL SYSTEM
Filed Aug. 14, 1939
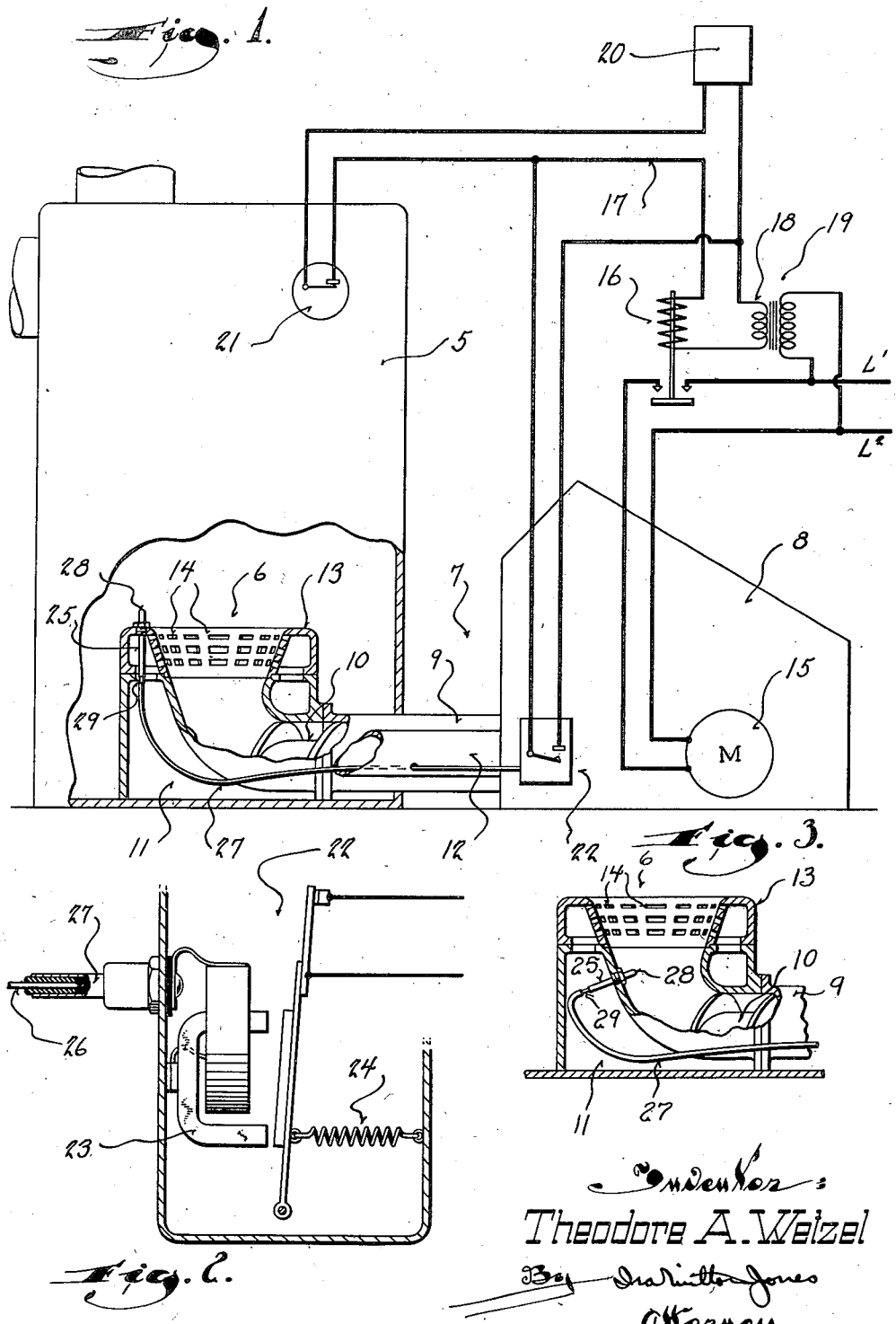

Patented Jan. 13, 1942

2,269,800

UNITED STATES PATENT OFFICE 2,269,800

STOKER CONTROL SYSTEM

Theodore A. Wetzel, Milwaukee, Wis., assignor to Milwaukee Gas Specialty Company, Milwaukee, Wis., a corporation of Wisconsin Application August 14, 1939, Serial No. 290,137

4 Claims. (Cl. 236—15)

This invention relates to control systems for heating equipment, and refers particularly to a control system for stokers of the domestic or industrial type.

While there are several different types of stokers in use, in general they all include a fire pot and mechanism usually driven by an electric motor or motors, or any other suitably powered driver, for supplying fuel and draft to the fire pot.

The main features of the control systems used in stokers heretofore in use are quite simple and comprise merely a circuit for controlling operation of the stoker motor or motors; an automatic switch to close this circuit; and a control circuit for the switch regulated or controlled by the usual room thermostat and including one or more limit switches.

These systems, however, provided no positive protection against extinction of the fire in the event the room thermostat did not call for heat for long periods of time.

The primary object of this invention therefore is to provide a control system for stokers which embodies a practical and simple low fire control effective to maintain the fire over periods of time that the room thermostat does not call for heat.

Another object of this invention is to provide a low fire control having a switch in a stoker system which is in parallel with the room thermostat to function independently thereof and wholly at the dictation of temperature changes in the vicinity of the fire so that whenever the temperature thereat drops below a predetermined value, the stoker is rendered operative.

More specifically, it is an object of this invention to provide a control system for stokers wherein a thermocouple operating a control instrumentality controls operation of a motor or motors which run the fuel supply or air supply mechanism, or both, during the time intervals when the room thermostat is not calling for heat, the thermocouple being located in operating proximity to the fire and so positioned as to effect response of the control when the fire burns down to a level where extinguishment thereof will result unless replenished.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a diagrammatic illustration of one embodiment of this invention;

Figure 2 is a detail view showing the automatic low fire control switch which controls the functioning of the stoker at the dictation of temperature changes at the fire zone; and Figure 3 is a view of the fire pot showing another location for the heat sensitive element.

Referring now particularly to the accompanying drawing in which like numerals indicate like parts, the numeral 5 designates a furnace, boiler, or other heating plant of any conventional design, in the lower portion of which is mounted the fire pot 6 of a stoker, indicated generally by the numeral 7. In addition to the fire pot 6, the stoker comprises a hopper 8 and a conveyor duct 9 leading from the bottom of the hopper to the fire pot through which fuel is conveyed by means of an appropriate screw 10.

The fire pot is constructed with a central funnel-shaped receptacle for fuel, surrounded by an air chamber 11 to which air is conducted from a fan (not shown) through a duct 12 entering the heating plant alongside the conveyor 9. At the upper portion of the air chamber and fire pot is a ring 13 having a plurality of tuyères 14 located to provide adequate draft for the fire.

Inside the housing of the hopper 8 is a motor 15 which is connected in a suitable manner with the fan (not shown) and the conveyor screw 10 to drive these elements. The motor is connected across the supply lines $L^1$—$L^2$ upon closure of an electromagnetic switch 16. The closure of the electromagnetic switch 16 is dependent upon the closure of a low voltage control circuit 17 deriving energy from the secondary 18 of a step-down transformer 19, the primary of which is connected across the lines $L^1$—$L^2$.

Connected in the low voltage control circuit 17 is a conventional room thermostat 20, which, whenever the space to be heated drops in temperature below a predetermined degree, calls for heat by closing the control circuit 17.

A normally closed limit switch 21 is also connected in the control circuit. This switch has its sensitive element (which is not shown) located either in the dome of the heating unit, as shown, or in the stack, to shut down the stoker operation whenever the temperature thereat exceeds a predetermined degree.

To the extent described, the control system is conventional, but this system, as noted, makes no provision for low fire control, that is, in the event the room thermostat 20 fails to call for heat for long periods of time, it is very possible that the fire will go out.

To guard against this objectionable condition, a low fire control switch, designated generally by the numeral 22, is connected in the low voltage control circuit 17 in parallel with the room thermostat. This switch 22 is open as long as the temperature within operating proximity to the fire remains above a predetermined degree, but closes the instant the temperature drops below this value to close the control circuit 17 and render the stoker operative.

This low voltage control switch 22 is actuated by an electromagnet 23 and is open as long as this magnet is energized. Deenergization of the electromagnet 23 permits the switch 22 to close by virtue of the fact that its contactor is biased to closed position by a spring 24, or its equivalent.

The electromagnet 23 is energized by a thermocouple 25, the leads of which consist of an internal conductor 26 within an external conductor 27, with proper insulation therebetween. Each of these leads connects with one side of the coil of the electromagnet. The leads are bendable and lead to the thermocouple which is located in operative proximity to the fire.

The switch 22 may be mounted in any convenient location, and the thermocouple leads may enter the air chamber 11 of the fire pot through the air duct 12, which makes it convenient to secure the thermocouple to the ring 13 with its hot junction 28 exposed to the direct heat of the fire, while its cold junction 29 is inside the ring and insulated from the hot junction. Consequently, when the fire recedes due to long periods of inaction on the part of the room thermostat, and the temperature at the hot junction 28 drops and approaches that of the cold junction 29, the electromotive force produced by the thermocouple depreciates to the point where the electromagnet 23 no longer holds the switch 22 open. The stoker motor 15 is then connected across the lines and the stoker operates to replenish the fuel supply.

With the rising temperature at the hot junction 28 of the thermocouple, the switch 22 is again opened, as will be readily apparent.

From the foregoing description taken in connection with the accompanying drawing, it will be readily apparent that this invention provides a control system for stokers which positively guards against extinction of the fire due to long periods of inaction on the part of the usual room thermostat, or other control device or antenna used to initiate the functioning of the stoker, and that the addition of the elements necessary to accomplish this result, in nowise complicates the system or increases the cost thereof objectionably.

It will also be readily apparent that while the foregoing description embraces an arrangement in which the switch controlled by the thermocouple opens when the temperature at the hot junction rises above a predetermined value, the opposite mode of operation in which the switch would close upon a rise in temperature at the thermocouple may be used with equal effectiveness. In that event, either the circuit connecting the switch with the instrumentalities will have to be appropriately altered, or the thermocouple re-located to a position in the green coal, as shown in Figure 3. With the thermocouple so positioned, it is normally out of the zone of greatest heat, for only when the fire burns down due to inaction of the stoker, does the thermocouple enter the actual combustion zone.

What I claim as my invention is:

1. In a stoker fired furnace wherein green coal is fed by power driven means through a retort to the fire zone of the furnace and in which an air supply chamber surrounds and communicates with the retort to supply air thereto from the exterior of the furnace for the support of combustion in the furnace, an automatic fuel feed control system comprising: a thermocouple having a hot junction at one extremity and a cold junction adjacent to its other extremity; means mounting the thermocouple in said air supply chamber with the extremity providing the hot junction of the thermocouple projecting through an aperture in the wall of the retort spaced beneath the fire zone of the furnace to lie in the path of green coal fed through the retort in the normal operation of the stoker, the cold junction in said air supply chamber being cooled by the air fed to the retort to produce a substantially great temperature differential between the hot and cold junctions of the thermocouple at the time the fire "burns down" in the retort and approaches the hot junction to thereby insure a rapid and positive generation of current by the thermocouple; and means rendered operative by the current generated by the thermocouple as the fire "burns down" and heats the hot junction of the thermocouple for effecting the functioning of the power driven fuel feeding means.

2. In a stoker fired furnace wherein green coal is fed by power driven means through a retort to the fire zone of the furnace, an automatic fuel feed control system comprising: a thermocouple having a hot junction at one extremity disposed at the interior of the retort a substantial distance beneath the normal fire zone of the furnace so as to lie in the path of green coal fed through the retort in the normal operation of the stoker, said thermocouple having its cold junction disposed at the exterior of said retort so as to be insulated from the hot junction of the thermocouple whereby a substantially great temperature differential is produced between the hot and cold junctions of the thermocouple at the time the fire "burns down" in the retort and approaches the hot junction to thereby insure a rapid and positive generation of current by the thermocouple; and means rendered operative by the current generated by the thermocouple as the fire "burns down" and heats the hot junction of the thermocouple for effecting the functioning of the power driven fuel feeding means.

3. In a stoker fired furnace wherein green coal is fed by power driven means through a retort to the fire zone of the furnace, an automatic fuel feed control system comprising: a thermocouple having a hot and a cold junction; means mounting the thermocouple on the wall of the retort with its hot junction inside the retort and spaced a substantial distance from the normal fire zone of the furnace to lie in the path of green coal fed through the retort to the fire zone during normal operation of the furnace, the cold junction of the thermocouple being located in a zone of lower temperature than obtains at said hot junction at the time the fire "burns down" in the retort and approaches the hot junction so as to produce a substantially great temperature differential between the hot and cold junctions of the thermocouple at said time to thereby insure a rapid and positive generation of current by the thermocouple; and means rendered operative by the current generated by the thermocouple as the fire "burns down" and heats the hot junction of the thermocouple for effecting the functioning of the power driven fuel feeding means.

4. A control system for stokers of the type having a fire pot provided with an air supply chamber exteriorly thereof and having power driven means for feeding fuel to the fire pot, comprising: a thermocouple mounted with its cold junction in said air supply chamber and its hot junction in the fire pot and spaced a substantial distance beneath the normal fire zone in the fire pot, said thermocouple operating to produce a flow of current only when the fire "burns down" in the fire pot and approaches the hot junction of the thermocouple to heat the same; and means rendered operative by current generated in the thermocouple upon heating of its hot junction as the fire "burns down" for effecting the functioning of the power driven fuel feeding means.

THEODORE A. WETZEL.